UNITED STATES PATENT OFFICE.

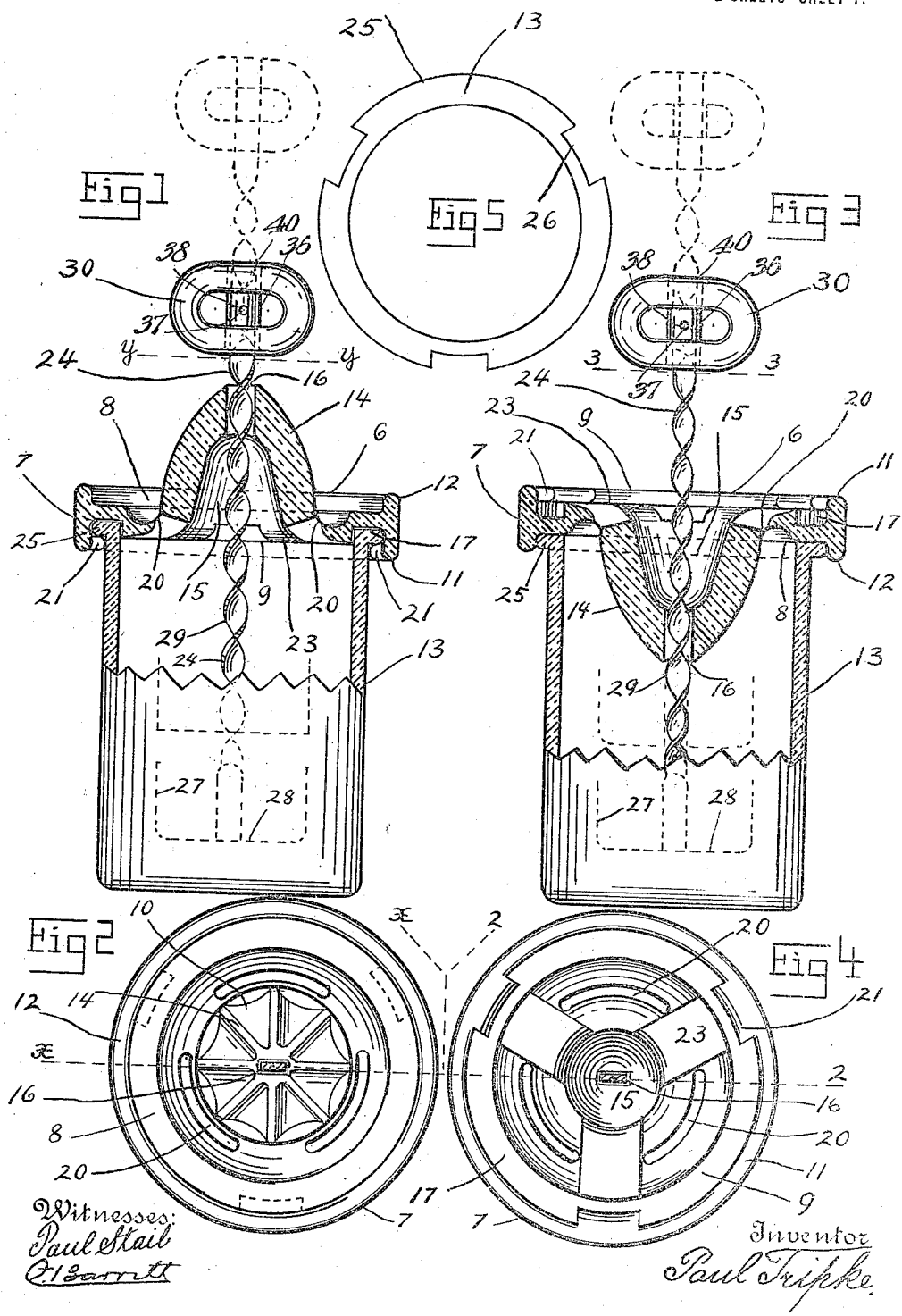

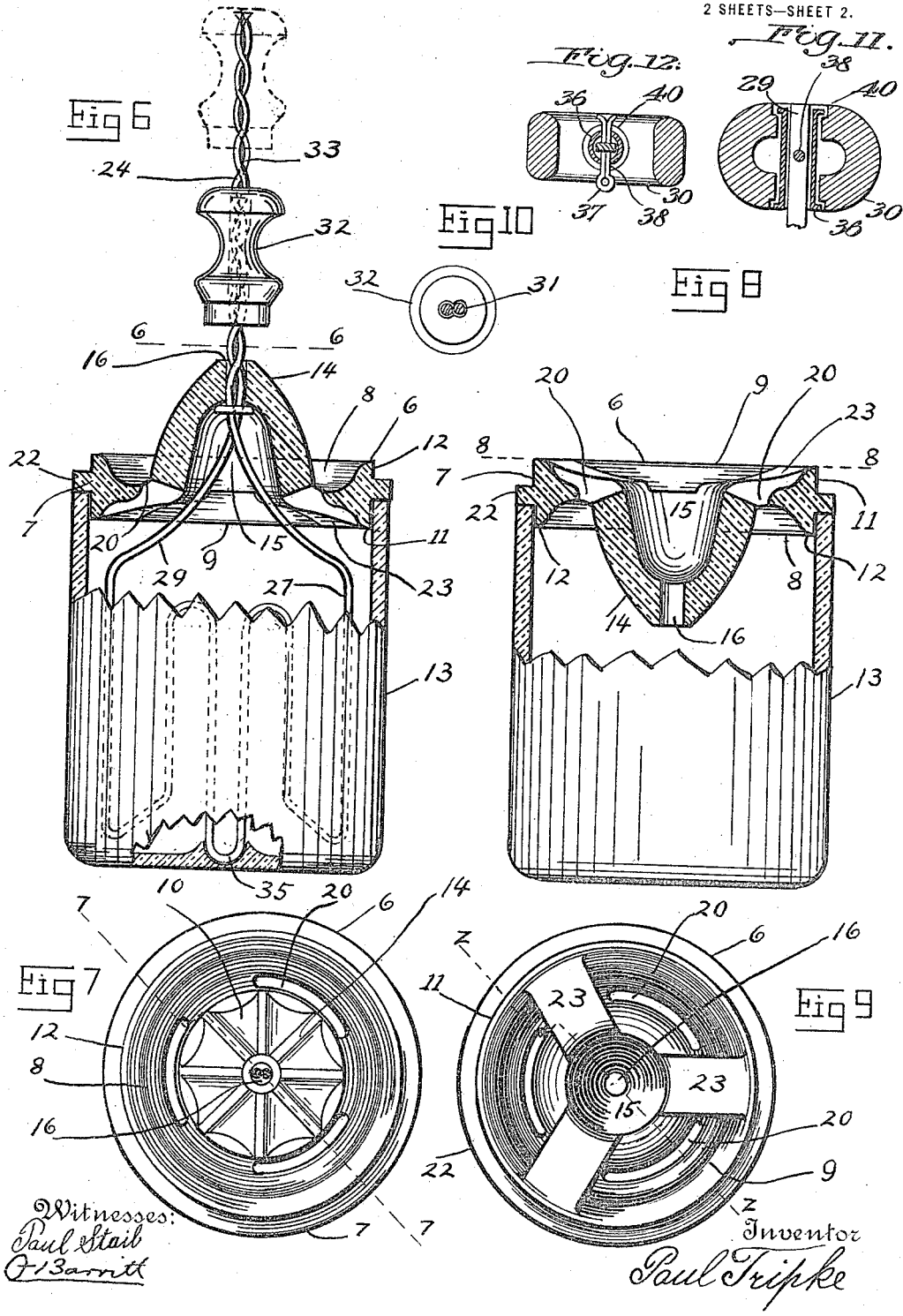

PAUL TRIPKE, OF JERSEY CITY, NEW JERSEY.

COMBINED EGG-SEPARATOR AND JUICE-EXTRACTOR, AND BEATING DEVICE.

1,238,461.     Specification of Letters Patent.     Patented Aug. 28, 1917.

Application filed November 20, 1915. Serial No. 62,667.

*To all whom it may concern:*

Be it known that I, PAUL TRIPKE, citizen of the United States, and resident of Jersey City, in the county of Hudson and State of New Jersey, have invented certain new and useful Combined Egg-Separators and Juice-Extractors, and Beating Devices, of which the following is a specification.

My invention relates to a new article of manufacture, and the object is in the combination of a closure or cover, a juice-extractor and an egg-separator formation formed integrally on and with said closure, and beater or mixer mechanism, all operating jointly and together, so that one article can be made to serve three, or more purposes, thus saving the cost of manufacturing and time of handling separate articles and vessels for separate purposes.

Referring to the drawings:—

Figure 1— is a vertical sectional elevation on line X X Fig. 2 of my new article of manufacture—juice-extractor-egg-separator-beater-closure—showing the same secured on to the beater or mixer-container (partly in section) and also showing it as a juice extractor—the beater mechanism inserted.

Fig. 2— is a plan sectional view on line Y Y Fig. 1.

Fig. 3— is another vertical sectional view taken on line 2—2 Fig. 4 showing the closure inverted, so that it can be used as an egg-separator—the beater mechanism inserted.

Fig. 4— is a plan sectional view on line 3—3 Fig. 3.

Fig. 5— is a detached top view of the container, showing the notches cut in the rim of same.

Fig. 6— is another vertical sectional view on line 7—7 Fig. 7 showing the closure as a juice-extractor and simply resting on the container of the beater—beater mechanism inserted.

Fig. 7— is a plan sectional view on line 6—6 Fig. 6.

Fig. 8— is a vertical sectional view on line Z—Z Fig. 9 showing the closure inverted so that it can be used as an egg-separator—the beater mechanism omitted.

Fig. 9— is a plan view on line 8—8 Fig. 8.

Fig. 10— is a detached bottom view of the operating handle.

Fig. 11— is a detached sectional elevation of the handle.

Fig. 12— is a cross-sectional view of the handle.

Like letters refer to like parts throughout the specification.

Numeral 6 represents my new article of manufacture as adapted to co-act with beaters or mixers, as shown in Figs. 1–6.

This combined juice-extractor-egg-separator-beater-closure comprises a base or body portion 7 made of glass, porcelain or similar materials (or metal may be used) and having two surfaces 8—9.

The outer edge of this base 7 has integrally formed onto it two flanges 11—12; the former serving as a locking means and the latter as a rest or holding means for the closure onto the container 13 of the beater or mixer.

Flange 12 also serving as an overflow-check for the extracted juice, and flange 11 as an overflow-check for the separated white portion of an egg. Surface 8 of the base 7 has integrally formed on or with it the conical dome or juice-extractor-formation 14, which may be of any desired height or size, said dome is also provided on its outer surface with suitable flutings 10 of any number and size.

The surface 8 between the dome 14 and the flange 12 is preferably basin or dish-shaped. Said basin-shaped surface 8 of the base 7 is at or near the dome 14, provided with orifices 20 of any number or size, which are cut entirely through said base and connect with surface 9, said orifices serving as passages between surfaces 8—9.

The hereinbefore described surface 8 of base 7 adapts the same to a juice extractor.

The surface 9 of base 7 is integrally provided with a cavity 15 which extends through surface 9 and some distance into the dome 14.

Said surface 9 between flange 11 and cavity 15 is also provided with a basin or dish-shaped formation and at or near the said cavity the orifices 20 are cut through to connect with surface 8.

To further support the dome 14 to the base 7 I may provide the dish-shaped surface 9 with webs 23 integrally connecting with said dome and said surface.

Through the top of the dome 14 is cut the orifice or guiding aperture 16 to connect with the dome cavity 15, the shape and purpose of said orifice will be explained hereafter.

I have shown surface 9 in Figs. 1–3 provided with a ring cavity 17 for the container rim 25 to set in; this ring cavity may however be dispensed with, and I may provide in some cases the flange 11—12, on their outer surfaces and integrally therewith, with a resting rim 22 as shown in Figs. 6–8 without departing from my invention.

The hereinbefore described surface 9 is adapted to act as an egg-separator. This closure as herebefore described with its two surface formations which converts the said closure into a useful and novel juice-extractor and egg-separator, is in Fig. 1—held or secured onto the container 13 by the bayonet-type of fastening. In this case the inner edge of flange 11 is integrally provided with a series of lips 21, which co-act with the rim 25 of the container 13 and to allow said lips to pass under the rim 25, I have provided said rim with notches 26 which are cut away at intervals to correspond with the lips 21.

This bayonet type of fastening I may however dispense with and use other means.

The beater or mixer mechanism 24 may vary in operation, some moving up and down within the container 13 (see Figs. 1–3) and some simply revolving within the same (see Fig. 6).

In Figs. 1–3 the beater mechanism is moved up and down within the container by taking hold of detachable handle or knob 30 on spiral or twisted rod 29 which has on its lower end a dasher 28 with arms 27.

The said knob or detachable handle 30 is provided with a central hole 40 into which loosely revolves the sleeve or tube 36, and to prevent the same from being withdrawn I preferably bend the ends of the sleeve over and upon the knob, thus securing it in place.

Through this sleeve is inserted the free end of the spiral or twisted rod 29, which is held thereto by a pin 37 passing through the holes 38 cut into the sleeve and the rod see Figs. 1 and 3. In detaching the knob or handle 30 with its sleeve or tube 36 from the twisted rod 29, simply, take hold of the head on pin 37 and pull the same out of the hole 38 in rod 29 and pull the said knob off from said twisted rod, see Figs. 11 and 12.

The said spiral or twisted rod by being reciprocated up and down in the dome orifice or guiding aperture 16, which is oblong to meet the flat conditions of said spiral or twisted rod, and by coming in contact with the walls of said orifice, is given a rotary back and forth movement.

In Fig. 6 the beater arms 27 of rod 29 revolve on their central point 35 on the bottom and within the container the twisted or spiral part 33 of the said beater rod extends through and above the dome orifice or guiding aperture 16 which is made round to accommodate the revolving movement of said rod. A detachable handle or knob 32 having orifices 31 is slipped on and over said twisted part of rod 29 and reciprocated up and down on same, said rod by coming in contact with said orifices 31 is giving a rotary back and forth movement.

Heretofore the juice of a lemon or the like had to be extracted on a separate article and over a separate vessel and then poured in to a mixer to be acted upon.

Similar unnecessary articles had to be used to separate the yolk from the white of an egg, and to beat the same, as a separate article and vessel were required for the separating of an egg, and after this a beater or mixer with a cover or closure was required to beat or mix the same.

In my invention by integrally forming one side of the beater or mixer-closure with a juice-extractor-formation as described I am able to dispense with the use of a separate vessel and a separate article and by integrally forming the other side of said beater or mixer-closure in to an egg separating formation as described, I am able to dispense with the use of another article and separate vessel. To use my new article of manufacture 6 to extract the juice from a lemon or the like, simply place said article with its juice-extractor-formation side up, on to the mixing container 13 and allow the flange 11 of said article to engage with same, to prevent its falling off, as shown in Figs. 1–6. The beater mechanism should be left out. Half a lemon or orange is then placed on the top of dome 14. Now by pressing the sides of the lemon inwardly and downwardly and at the same time twisting them around on the fluted part of the said dome, the juice will be extracted and run through the orifices 20 of the base 7 in to the mixing container 13.

If the said article 6 is to be used to separate the white from the yolk of an egg, simply place the said article in an inverted position on the container 13 and allow the flange 12 of said article 6 to engage with same, to prevent its falling off (see Fig. 8). The egg is then broken and the contents therefrom dropped in to the dish-shaped surface 9 and cavity 15 of said article 6; the yolk which is heavier will settle in to the said cavity and the white portion of the egg which is of less specific gravity will remain above and in surface 9 and from there flow through the said orifices 20 of base 7 into the container, thus separating the yolk from the white of an egg. The yolk can then be poured out from the cavity 15, and the said article can be positioned for a similar operation. Now if it is desired to beat or mix the extracted juice or the separated portion of an egg simply insert the beater or mixer mechanism 24 in to the dome orifice or guiding aperture 16 of the juice-extractor-egg-separator-beater-closure and operate the respective beaters in their particular way.

It must now be apparent from the foregoing description that I have produced a new and novel invention by so forming the surface of a closure, that at one period it can be used, as a juice extractor, at another as an egg-separator, and at another as a medium for operating the beater arms of a mixer.

In cleaning my new article, the closure can be easily separated from the container and the beater, from the closure which makes it possible to thoroughly wash and clean each part separately thereby rendering the article highly sanitary.

I do not confine myself to any particular shape of the egg separator and juice extractor formation as I am aware other shapes will produce the same result, nor do I confine myself to the particular beater mechanisms shown as I am aware others can be used.

What I claim is:—

1. A combined juice-extractor-egg-separator-beater-closure wherein, said closure has one of its surfaces formed into a juice-extractor-formation and the other surface into an egg-separator-formation, a beater mechanism adapted to engage or coact with said closure.

2. A new article of manufacture comprising a combined juice-extractor-egg-separator-beater-closure, having two surfaces, a juice extractor-formation integrally formed on one of its surfaces, an egg-separator-formation integrally formed on the other surface and a beater mechanism adapted to coact with the said closure.

3. A new article of manufacture comprising, a beater-closure, a container, said closure having two surfaces, a juice-extractor-formation integrally formed on one surface, an egg-separator-formation formed into the other surface, said closure adapted with either surface to rest on the said container, a beater mechanism adapted to engage or coact with said closure.

4. A combined juice-extractor-egg-separator-beater closure, wherein, said closure has one of its surfaces formed into a juice-extractor-formation and the other surface into an egg-separator-formation, a guiding aperture piercing and connecting both surfaces, and a beater mechanism adapted to engage or co-act with said guiding aperture.

5. A new article of manufacture, comprising a beater-closure wherein one surface of said closure is shaped into a juice-extractor-formation and the other surface into an egg-separator-formation, a guiding aperture piercing said closure and connecting both of said surfaces, a beater-mechanism, having a spiral or twisted rod, said rod adapted to engage with and rotate in said aperture.

6. A new article of manufacture comprising a beater-closure having two surfaces, a juice-extractor-formation integrally formed on one surface, an egg-separator-formation formed into the other surface, a guiding aperture, piercing said closure and connecting both surfaces, a beater mechanism having a spiral or twisted rod, said rod adapted to be reciprocated through said aperture to give said beater mechanism a rotary motion.

7. A new article of manufacture comprising a beater closure, a container, said closure adapted to be secured on to the said container, a juice-extractor encircled by a basin integrally formed on one surface of said closure, an egg-separator-formation, formed into the other surface of said closure, a guiding aperture, piercing and connecting both surfaces, a beater mechanism adapted to engage or co-act with said aperture and also adapted to revolve within the said container.

8. A new article of manufacture comprising a beater-closure having two surfaces, one of said surfaces being formed into a juice-extractor encircled by a basin, the other surface being formed into an egg-separator-cavity also encircled by a basin, orifices piercing said inclosure and connecting both basins, a guiding aperture piercing the top of said extractor and connecting with said cavity, a beater mechanism adapted to co-act with said aperture.

9. A new article of manufacture comprising a beater closure, a container, said closure having two surfaces, a juice-extractor encircled by a basin integrally formed on one surface, an egg-separator-formation provided with a cavity, formed into the other surface, said basin provided with orifices, which at intervals pierce the said closure and connect both surfaces, a guiding aperture in the top of said juice extractor also piercing said closure and connecting with said cavity, said closure adapted to rest on the said container, a beater mechanism, said guiding aperture adapted to engage or co-act with said beater mechanism, which is adapted to revolve within the said container and in the said aperture, means for operating said beater mechanism.

10. A new article of manufacture comprising a beater closure having two surfaces, one of said surfaces formed into a juice-extractor encircled by a basin, said basin provided with orifices, said orifices encircling at intervals the base of said extractor and piercing said closure to connect with the other surface, which is formed into an egg-separator-cavity also encircled by a basin said cavity, at intervals, encircled and divided from the latter mentioned basin, by said orifices, a guiding aperture in the top of said juice-extractor also piercing said closure to connect with said cavity, a beater mechanism having a spiral or twisted rod, said rod adapted to be rotated in said aperture and means for rotating said rod.

11. A new article of manufacture comprising a beater closure having two surfaces, one of said surfaces formed into a juice-extractor encircled by a basin and the other formed into an egg-separator-cavity, also encircled by a basin, orifices piercing said closure and connecting both basins, a guiding aperture, piercing the top of said juice extractor and connecting with said cavity, a beater mechanism having a spiral rod, said rod adapted to be reciprocated through said aperture to give said beater mechanism a rotary motion.

12. A new article of manufacture comprising a beater closure having two surfaces, one surface being formed into a juice-extractor encircled by a basin and the other being formed into an egg-separator-cavity also encircled by a basin, orifices piercing said closure and connecting both basins, a guiding aperture piercing the top of said juice-extractor and connecting with said cavity, a beater mechanism having a spiral or twisted rod, said rod adapted to be reciprocated through said aperture to give said beater mechanism a rotary motion, a detachable knob, said knob adapted to be secured onto said spiral or twisted rod and also adapted to be disengaged from said rod, so as to allow the separation of the said beater mechanism from the said closure.

13. A new article of manufacture comprising a combined juice extractor-egg-separator-beater-closure wherein said closure has one of its surfaces formed into a juice-extractor-formation and the other surface into an egg separator formation, a beater mechanism, a spiral or twisted rod of said beater mechanism adapted to engage or co-act with said closure, a detachable knob, said knob adapted to be secured onto said rod.

14. A new article of manufacture comprising a beater closure, a container, said closure adapted to be secured onto said container, a juice-extractor-encircled by a basin integrally formed on one surface of said closure, an egg-separator-formation formed into the other surface of said closure, a guiding aperture, piercing and connecting both surfaces, a beater mechanism having a spiral or twisted rod, said rod adapted to co-act with said aperture, a detachable knob, said knob adapted to be secured on to said rod and also adapted to be disengaged from said rod, so as to allow the separation of the said beater mechanism from the said closure.

15. A new article of manufacture comprising a combined juice extractor-egg-separator-beater closure wherein said closure has one of its surfaces formed into a juice extractor formation and the other surface into an egg-separator-formation, a guiding aperture piercing and connecting both surfaces, a beater mechanism having a spiral or twisted rod which is adapted to engage or coact with said aperture, a detachable knob, said knob detachably secured onto said rod.

16. A new article of manufacture a beater closure, a container, said beater closure adapted to be secured onto said container, a juice-extractor-formation integrally formed on one surface of said closure an egg-separator-formation formed into the other surface of said closure, a guiding aperture piercing and connecting both surfaces, a beater mechanism, a spiral or twisted rod of said beater mechanism adapted to engage with, and rotate in, said aperture and in the said container, a detachable knob, said knob detachably secured onto said rod.

Signed at Jersey City, in the county of Hudson and State of New Jersey, this 17th day of November, A. D. 1915.

PAUL TRIPKE.

Witnesses:
 F. BARRITT,
 W. E. BARNES.